United States Patent
Arai et al.

(10) Patent No.: US 6,815,477 B1
(45) Date of Patent: Nov. 9, 2004

(54) FLAME-RETARDANT POLYAMIDE RESIN COMPOSITION, AND ELECTRICAL PARTS EMPLOYING THE SAME

(75) Inventors: Toshihiro Arai, Kawasaki (JP); Tadashi Takeda, Kawasaki (JP); Katsuo Kobori, Kawasaki (JP); Osamu Hamazoe, Kawasaki (JP)

(73) Assignee: EC-Showa Denko K.K. (JP)

( * ) Notice: Subject to any disclaimer, the term of this patent is extended or adjusted under 35 U.S.C. 154(b) by 0 days.

(21) Appl. No.: 10/130,818

(22) PCT Filed: Nov. 20, 2000

(86) PCT No.: PCT/JP00/08174

§ 371 (c)(1), (2), (4) Date: Aug. 29, 2002

(87) PCT Pub. No.: WO01/38439

PCT Pub. Date: May 31, 2001

(30) Foreign Application Priority Data

Nov. 19, 1999 (JP) .......................................... 11-329618

(51) Int. Cl.⁷ ............................................. C08L 77/00
(52) U.S. Cl. ........................ 524/127; 524/115; 524/538
(58) Field of Search ............................... 524/127, 115, 524/538

(56) References Cited

U.S. PATENT DOCUMENTS 6,031,032 A * 2/2000 Horacek et al. ............ 524/100

FOREIGN PATENT DOCUMENTS

| EP | 0881264 A | | 12/1998 |
| JP | 8-165425 | * | 6/1996 |
| JP | 11-106646 | * | 4/1999 |
| WO | WO 96 09344 A | | 3/1996 |

OTHER PUBLICATIONS

Patent Abstract of Japan vol. 2, No. 89 (C–018), Jul. 21, 1978 & JP 53 049054 A (Asahi Chem Ind Co Ltd) May 4, 1978.

* cited by examiner

*Primary Examiner*—Ana Woodward
(74) *Attorney, Agent, or Firm*—Banner & Witcoff, Ltd.

(57) ABSTRACT

The purpose of the present invention is to provide a flame-retardant polyamide resin composition which neither causes environment pollution nor liberates toxic combustion gases, exhibits good flame-retardancy even if an inorganic filler is compounded with the polyamide-based resin, and hardly stains the mold during molding. Provision of a flame-retardant polyamide resin composition comprising (A) 20 to 89 wt.-% of a polyamide-base resin consisting of a polyamide resin obtained from xylylene diamine and an $\alpha,\omega$-straight-chain aliphatic dibasic acid, (B) 1 to 30 wt.-% of a salt of polyphosphoric acid and melamine, and (C) 10 to 50 wt.-% of inorganic filler; and of electrical parts employing the composition.

9 Claims, No Drawings

FLAME-RETARDANT POLYAMIDE RESIN COMPOSITION, AND ELECTRICAL PARTS EMPLOYING THE SAME

TECHNICAL FIELD

The present invention relates to a flame-retardant polyamide resin composition for use in electronic/electrical parts, automotive electrical equipment parts, etc.

PRIOR ART

Polyamide resins with excellent heat-resistance, mechanical properties, and moldability are utilized for parts in various industrial fields. When the resins are used for such application, it is often required to render them flame-retardant. Flame retardants, such as halogen compounds, metal hydroxides, nitrogen compounds, and phosphorus compounds, have been used for such purpose. However, use of halogen compounds causes environmental pollution by dioxin, etc., and generates toxic combustion gases, use of metal hydroxides has insufficient flame-retarding effect, and use of nitrogen compounds may result in inferior flame-retardancy of the resin when an inorganic filler is added.

The flame-retardant composition comprising melamine phosphate disclosed in JP Patent Appln. Disclosure No. 53-49054/78 generates volatiles when injection-molded, which staining the mold and impairing the appearance of the molded product.

As flame-retardant composition the flame-retardancy of which is not reduced even when an inorganic filler is compounded with the polyamide resin, and by which only a relatively small amount of volatiles is generated under injection molding, there is disclosed in JP Patent Appln. Disclosure No. 10-505875/98 a flame-retardant glass fiber-reinforced polyamide resin composition prepared by addition of a melamine- or melem-phosphoric acid reaction product or a mixture thereof to a polyamide resin. A relatively large amount of flame-retardant must be added for the purpose of endowing the composition with flame-retardancy of grade V-0 in the UL94 flammability test, performed by using a 1.6 mm (¹⁄₁₆ in.) thick test piece. If the flame-retardancy of the composition is to be increased to the level of grade V-0 in said test when using a 0.8 mm (¹⁄₃₂ in.) thick test piece, the amount of flame-retardant to be added must be further increased, and the increase causes staining of the mold under injection molding.

DESCRIPTION OF THE INVENTION

The purpose of the present invention is to solve the above problems and to provide a flame-retardant polyamide resin composition which does not involve the disadvantage of causing environmental pollution and generating toxic gas during combustion, and which exhibits excellent flame-retardancy even if an organic filler is compounded with the polyamide resin, hardly staining the mold during molding.

As a result of various efforts to attain the above purpose, the inventors have found that an inorganic filler-containing flame-retardant polyamide resin composition is highly improved in carbonization and flame-retardancy if it comprises a polyamide resin obtained from xylylene diamine and an α,ω-straight-chain aliphatic dibasic acid as well as a salt of a melamine and polyphosphoric acid.

The present invention provides a flame-retardant polyamide resin composition which comprises (A) 20 to 89 wt.-% of a polyamide-based resin consisting of a polyamide resin obtained from xylylene diamine and an α,ω-straight-chain aliphatic dibasic acid, (B) 1 to 30 wt.-% of a salt of polyphosphoric acid and melamine, and (C) 10 to 50 wt.-% of inorganic filler, and electrical parts employing said composition.

The present polyamide-based resin comprises as essential component a polyamide resin obtained from xylylene diamine and an α,ω-straight-chain aliphatic dibasic acid (hereinafter referred to as "MX nylon"). The polyamide resin is generally a polymer compound containing acid amide bonds (—CONH—) as repeating units. A suitable MX nylon is a polyamide resin obtained from methaxylylene diamine and adipic acid.

There are no particular restrictions on the kind polyamide resins simultaneously employed. Examples of aliphatic polyamides are polyamides prepared from a lactam or an aminocarboxylic acid, such as polyamide 6, polyamide 11, polyamide 12, etc., polyamides prepared from a dicarboxylic acid and diamine, such as polyamide 46, polyamide 66, polyamide 610, polyamide 612, etc., and copolymer polyamides, such as polyamide 6-66, polyamide 6-610, etc. Examples of semiaromatic polyamides are polyamides obtained from an aromatic dicarboxylic acid, e.g. terephthalic acid (T) and isophthalic acid (I), and an aliphatic diamine, such as polyamide 6T, polyamide 6I, polyamide 6T/6I, etc. These polyamide resins can be used independently or in admixture. Among these, aliphatic polyamides, in particular polyamide 6, polyamide 66, and polyamide 6-66 copolymer, are preferable.

The compounding amount of MX nylon in the polyamide-based resin is preferably 20 to 100 wt.-%, more preferably 40 to 100 wt.-%.

An example of the present salt of polyphosphoric acid and melamine is a compound represented by the formula (I)

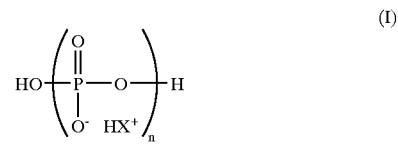

(I)

wherein n is an integer and X is a melamine represented by the formula (II)

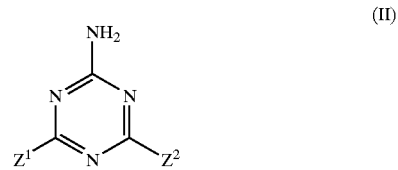

(II)

wherein $Z^1$ and $Z^2$ may be identical or different, and each represents a residue selected from the group consisting of —$NR^1R^2$ groups ($R^1$ and $R^2$ being independently a hydrogen atom, a straight-chained or branched alkyl group with a carbon atom number of 1 to 6, or a methylol group), hydroxyl groups, mercapto groups, straight-chained or branched alkyl groups with a carbon atom number of 1 to 10, straight-chained or branched alkoxyl groups with a carbon atom number of 1 to 10, phenyl groups, and vinyl groups.

Out of the above salts of polyphosphoric acid and melamine, such salts in which $Z^1$ and $Z^2$ are —$NH_2$ groups are preferably used.

The compounding amount of the salt of phosphoric acid and melamine in the present flame-retardant polyamide resin composition is 1 to 30 wt.-%, preferably 5 to 25 wt.-%, more preferably 7 to 20 wt.-%, with which amounts very excellent flame-retardancy and moldability are simultaneously achieved. If the amount is below 1 wt.-%, sufficient flame-retardancy is not obtained. Use of an amount exceeding 30 wt.-% causes increased generation of volatiles during molding, staining of the mold, and impaired moldability.

There are no particular restrictions as far as the present inorganic filler is concerned. Examples are glass fibers, whiskers, calcium carbonate, talc, clay, silica, alumina, glass beads, etc. Out of these, glass fibers, whiskers and calcium carbonate are preferable, in particular glass fibers.

The amount of inorganic filler compounded with the present flame-retardant polyamide resin composition is 10 to 50 wt.-%, preferably 15 to 45 wt.-%, more preferably 20 to 40 wt.-%. Use of an amount below 10 wt.-% results in insufficient mechanical strength. On the other hand, the moldability is impaired if the amount exceeds 50 wt.-%.

The present flame-retardant polyamide resin composition is obtained by addition of a salt of phosphoric acid and melamine and an inorganic fillet to a polyamide-based resin in the known manner. There are no particular restrictions on the addition procedure. For example, the polyamide-based resin, the salt of phosphoric acid and melamine, and the inorganic filler may be simultaneously melt-kneaded, or the inorganic filler may be melt-kneaded into the mixture after mixing of the polyamide-based resin and the salt of phosphoric acid and melamine. The inorganic filler may also be added after the salt of phosphoric acid and melamine has been added before or during the polymerization producing the polyamide resin, unless the addition affects the polymerization reaction.

The present flame-retardant polyamide resin composition is effectively carbonized when heated. Generally, resins containing aromatic rings are easily carbonized under heating. On the other hand, if a polyphosphoric acid salt and melamine and an inorganic filler are compounded either with an aromatic ring-containing polyamide resin prepared from terephthalic acid (T) or isophthalic acid (I) and hexamethylene diamine (hereinafter referred to as "6T/6I nylon"), which is a typical aromatic ring containing polyamide as well as a MX nylon, or with a polyamide resin prepared from a mixture of 6T/6I nylon and aliphatic polyamide, the composition obtained is not carbonized as thoroughly as the present flame-retardant polyamide resin composition, and does not exhibit good flame-retardancy. It is recognized that the carbonization under heating of flame-retardant polyamide resin compositions is considerably promoted and good flame-retardancy achieved only in the simultaneous presence of MX nylon, polyphosphoric acid salt and melamine, although the scientific reason has not been completely clarified.

It is desirable that the flame-retardant polyamide resin composition obtained in the above manner exhibits a UL94 flammability test result of V-0 when tested with a 1/32 in. thick test piece.

To the present flame-retardant polyamide resin composition there can be further added various additives and fillers such as conventionally used in this field, as far as the effect of the present invention is not impaired. Examples of such additives are flame-retardants, auxiliary flame-retardants, antioxidants, UV absorbents, foaming agents, antistatics, colorants, nucleating agents, lubricants, and plasticizers.

The present flame-retardant polyamide resin composition can be molded by the known methods, e.g. extrusion, injection, compression, and blow molding, into various molded products, such as electrical parts, auto parts, household appliances, aircraft parts, and building materials. In particular, the present composition is advantageously used for electrical parts. Examples are automotive electrical equipment parts and parts of products used in the information communication industry, such as copying machines, personal computers, printers, telephones, and hand-held telephones, in particular their, housings, connectors, sockets, switches, and conductors.

EXAMPLES

The following examples illustrate the present invention, but are not intended to limit the scope.

The methods for the measurement of various physical properties are listed below:
(1) Flexural modulus of elasticity and flexural strength:
    The measurement is in accordance with ASTM D790.
(2) Flame-retardancy:
    The measurement is in accordance with the US UL94 method, using two test pieces different in thickness (size: 5 in.×½ in., thickness: 1/32 in. [0.8 mm] and ⅛ in. [3.2 mm]).
(3) Mold staining:
    After 100 injection shots for the production of color plates (size: 100 mm×100 mm; thickness: 2 mm) had been made using an injection molding machine (SH75, Sumitomo Juki K.K.) at a cylinder temperature of 270° C., a hopper temperature of 270° C., a nozzle temperature of 270° C., a mold temperature of 130° C., a batch length of 47 mm, an injection speed of 40%, a dwell of 0%, and a cooling time of 10 seconds, the mold surface was visually inspected in order to evaluate the surface condition based the following grading:
    ⊚: No mold staining observed, ○: Slight mold staining observed, ∆: Mold staining observed, x: Strong mold staining observed.

As polyamide resins there were used the following three types:

PA-1: MX Nylon with a relative viscosity (measured in accordance with JIS K6810) of 2.14, manufactured by Mitsubishi Gas Kagaku, K.K.

PA-2: Nylon 66 with a relative viscosity of 2.61, manufactured by Showa Denko K.K.

PA-3: Nylon 6 with a relative viscosity of 2.37, manufactured by Showa Denko K.K.

PA-4: 6T/6I Nylon (6T/6I=⅓) with a relative viscosity of 2.7, manufactured by Mitsubishi Engineering Plastics K.K.

As inorganic fillers there were used the following two types. Inorganic filler a:

Chopped glass fiber strands, Trade name: CS03-JAFT2A, manufactured by Asahi Fiber Glass K.K. Inorganic filler b:

Calcium carbonate, Trade name: NS-100, manufactured by

Nitto Funka Kogyo K.K.

The following substances were used as flame-retardants and auxiliary flame-retardants:

Flame-retardant a:

Melamine polyphosphate, Trade name: PMP-100, manufactured by Nissan Kagaku K.K.

Flame-retardant b:

Magnesium hydroxide, Trade name: Kisma (phonetic) 5E, manufactured by Kyowa Kagaku K.K.

Flame-retardant c:

Melamine cyanurate, Trade name: MC440, manufactured by
Nissan Kagaku K.K.
Flame-retardant d:
Melamine phosphate, manufactured by Nissan Kagaku K.K.
Flame-retardant e:
Dimelamine pyrophosphate, manufactured by DSM Melapur Co., Ltd.
Flame-retardant f:
Melam polyphosphate, Trade name: PMP-200, manufactured by Nissan Kagaku K.K.
Auxiliary flame-retardant a: Zinc borate Examples 1 to 6 and Comparison Example 1 to 15

The polyamide resins and flame-retardants shown in Tables 1 and 2 were previously mixed in a tumbling mixer in the compounding amounts set out in the tables. Each of the mixtures obtained and each of the inorganic fillers according to the table were fed from the main hopper and the side feed, respectively, into a 30 mm kneader with two axes rotating in the same direction (PCM 30, Ikegai Tekkosha K.K.) for melt kneading in order to obtain a composition. The compositions obtained were molded with an injection molding machine (Sumitomo Jyuki K.K.) for the preparation of test pieces. Each test piece was evaluated in respect of flexural modulus of elasticity and flexural strength, flame-retardancy and mold staining. The results are set out in Tables 1 and 2.

TABLE 1

| | Examples | | | | | |
|---|---|---|---|---|---|---|
| | 1 | 2 | 3 | 4 | 5 | 6 |
| PA-1 (wt.- %) | 60 | 27.5 | 27.5 | 37 | 60 | 27.5 |
| PA-2 (wt.- %) | | 27.5 | 13.8 | | | 27.5 |
| PA-3 (wt.- %) | | | 13.7 | 18 | | |
| PA-4 (wt. - %) | | | | | | |
| Inorganic filler a (wt.- %) | 30 | 30 | 30 | 30 | | |
| Inorganic filler b (wt.- %) | | | | | 30 | 30 |
| Flame-retardant a (wt.- %) | 10 | 15 | 15 | 15 | 10 | 15 |
| Flame-retardant b (wt.- %) | | | | | | |
| Flame-retardant c (wt.- %) | | | | | | |
| Flame-retardant d (wt.- %) | | | | | | |
| Flame-retardant e (wt.- %) | | | | | | |
| Flame-retardant f (wt.- %) | | | | | | |
| Auxiliary flame-retardant a (wt.- %) | | | | | | |
| Flexural modulus of elasticity (CPa) | 11.6 | 10.7 | 10.5 | 10.9 | 7.0 | 6.5 |
| Flexural strength (MPa) | 257 | 242 | 235 | 241 | 163 | 148 |
| Flame-retardency (⅛ in.) | V-0 | V-0 | V-0 | V-0 | V-0 | V-0 |
| Flame-retardency (1/32 in.) | V-0 | V-0 | V-0 | V-0 | V-0 | V-0 |
| Mold staining | ⊚ | ○ | ○ | ○ | ⊚ | ○ |

TABLE 2

| | Comparison Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| PA-1 (wt.-%) | 20 | 20 | 27.5 | 27.5 | 20 | | | | 20 | 20 | 27.5 | 27.5 | 20 | | |
| PA-2 (wt.-%) | 20 | 20 | 27.5 | 27.5 | 20 | 45 | 45 | 40 | 20 | 20 | 27.5 | 27.5 | 20 | | 27.5 |
| PA-3 (wt.-%) | | | | | | | | | | | | | | | |
| PA-4 (wt.-%) | | | | | | | | | | | | | | 60 | 27.5 |
| Inorganic filler a (wt.-%) | 30 | 30 | 30 | 30 | 30 | 30 | 30 | 30 | | | | | | 30 | 30 |
| Inorganic filler b (wt.-%) | | | | | | | | | 30 | 30 | 30 | 30 | 30 | | |
| Flame-retardant a (wt.-%) | | | | | | 20 | | | | | | | | 10 | 15 |
| Flame-retardant b (wt.-%) | 30 | | | | | | | | 30 | | | | | | |
| Flame-retardant c (wt.-%) | | 30 | | | | | | | | 30 | | | | | |
| Flame-retardant d (wt.-%) | | | 15 | | | | 20 | | | | 15 | | | | |
| Flame-retardant e (wt.-%) | | | | | | | | 30 | | | | | | | |
| Flame-retardant f (wt.-%) | | | | 15 | 30 | | | | | | | 15 | 30 | | |
| Auxiliary flame-retardant a (wt.-%) | | | | | | 5 | 5 | | | | | | | | |
| Flexural modulus of elasticity (CPa) | 12.6 | 12.1 | 10.5 | 10.8 | 10.1 | 12.0 | 12.3 | 11.4 | 7.8 | 7.7 | 6.3 | 6.8 | 6.3 | 11.8 | 11.0 |
| Flexural strength (MPa) | 244 | 240 | 237 | 240 | 233 | 231 | 233 | 225 | 153 | 150 | 149 | 150 | 146 | 257 | 245 |
| Flame-retardency (⅛ in.) | V-2 | V-2 NG | V-0 | V-0 | V-0 | V-0 | V-0 | V-0 | V-2 | V-2 NG | V-0 | V-0 | V-0 | V-2 NG | V-2 NG |
| Flame-retardency (1/32 in.) | V-2 | V-2 | V-2 NG | V-2 NG | V-0 | V-2 NG | V-2 NG | V-0 | V-2 | V-2 | V-2 NG | V-2 NG | V-0 | V-2 NG | V-2 NG |
| Mold staining | ○ | x | x | ○ | x | Δ | x | x | ○ | x | x | ○ | x | ⊚ | ○ |

Effects of the Invention

The present flame-retardant polyamide resin composition neither causes environmental pollution nor liberates toxic conbustion gases, exhibits good flame-retardancy even when an inorganic filler is compounded with the polyamide resin, and hardly stains the mold when injection-molded, being useful in various fields, such as in electrical parts, automotive parts, household appliances, aircraft parts, building materials, etc.

What is claimed is:

1. A flame-retardant polyamide resin composition, which comprises (A) 20 to 89 wt.-% of a polyamide-based resin comprising a polyamide resin obtained from xylylene diamine and an α,ω-straight-chain aliphatic dibasic acid, (B) 1 to 30 wt.-% of a salt of polyphosphoric acid and melamine, and (C) 10 to 50 wt.-% of inorganic filler.

2. Flame-retardant polyamide resin composition according to claim 1, in which the proportion of polyamide resin obtained from xylylene diamine and an α,ω-straight-chain aliphatic dibasic acid in the polyamide-based resin (A) is 20 to 100 wt.-%.

3. Flame-retardant polyamide resin composition according to claim 1, in which the polyamide-based resin (A), further comprises an aliphatic polyamide.

4. Flame-retardant polyamide resin composition according to claim 3, in which said aliphatic polyamide is at least one selected from the group consisting of polyamide 66, polyamide 6, and copolymers of polyamide 66 and polyamide 6.

5. Flame-retardant polyamide resin composition according to claim 1, which exhibit, in the form of a test piece with a thickness of 1/32 in., a result of V-0 in the UL94 flammability test.

6. Electrical part, comprising the flame-retardant polyamide resin composition according to any one of claims 1 to 5.

7. A flame-retardant polyamide resin composition comprising: 20 to 89 wt.-% of a polyamide-based resin comprising:

a polyamide resin obtained from xylylene diamine and an α,ω-straight-based chain aliphatic dibasic acid, the proportion of polyamide resin obtained from xylylene diamine and α,ω-straight-chain aliphatic dibasic acid in the polyamide-based resin being 20 to 100 wt.-%, and an aliphatic polyamide selected from the group consisting of polyamide 66, polyamide 6, and copolymers of polyamide 66 and polyamide 6; 1 to 30 wt.-% of a salt of polyphosphoric acid and melamine; and 10 to 50 wt.-% of inorganic filler.

8. Flame-retardant polyamide resin composition according to claim 7, which exhibits, in the form of a test piece with a thickness of 1/32 in, a result of V-0 in the UL94 flammability test.

9. Electrical part, consisting of the flame-retardant polyamide resin composition according to any one of claims 7 or 8.

\* \* \* \* \*